United States Patent [19]

Gay et al.

[11] 4,287,530

[45] Sep. 1, 1981

[54] DEMODULATOR SYSTEM INCLUDING A TUNABLE DISCRIMINATOR SUITABLE FOR USE IN A SECAM TELEVISION RECEIVER

[75] Inventors: Michael J. Gay, Chancy; Johannes A. Gutmann, Geneva, both of Switzerland

[73] Assignee: Motorola Inc., Schaumburg, Ill.

[21] Appl. No.: 148,347

[22] Filed: May 9, 1980

[51] Int. Cl.³ .............................................. H04N 9/50
[52] U.S. Cl. .................................................... 358/23
[58] Field of Search ............................ 358/23; 329/50

[56] References Cited

U.S. PATENT DOCUMENTS

| | | | |
|---|---|---|---|
| 3,806,632 | 4/1974 | Okada | 358/23 |
| 4,232,268 | 11/1980 | Hinn | 358/23 |

Primary Examiner—Richard Murray
Attorney, Agent, or Firm—Michael D. Bingham

[57] ABSTRACT

A demodulating system to be utilized in Secam television receivers for deriving the R-Y and B-Y chrominance information signals from the frequency modulated Secam RF subcarrier frequencies without the necessity for precise and stable tuned circuits. The demodulating system includes a single discriminator having an electronically tunable center frequency, a remodulator, for producing a reference frequency amplitude modulated by the chrominance information signals which are supplied to a commutator as known, and a feedback circuit coupled between the discriminator and remodulator. The discriminator is selectively tuned to a reference center frequency during each picture line clamp period to produce a zero level output signal. During the chrominance information portion of each line, the center frequency of the discriminator is alternately offset by first and second control signals to center frequencies coinciding with the two reference frequencies to produce a zero output level whenever the Secam signals are at the respective RF subcarrier frequencies. The feedback circuit ensures that the zero output levels obtained during the information carrying portion of each line is identical with the zero output level set during the clamp period.

4 Claims, 3 Drawing Figures

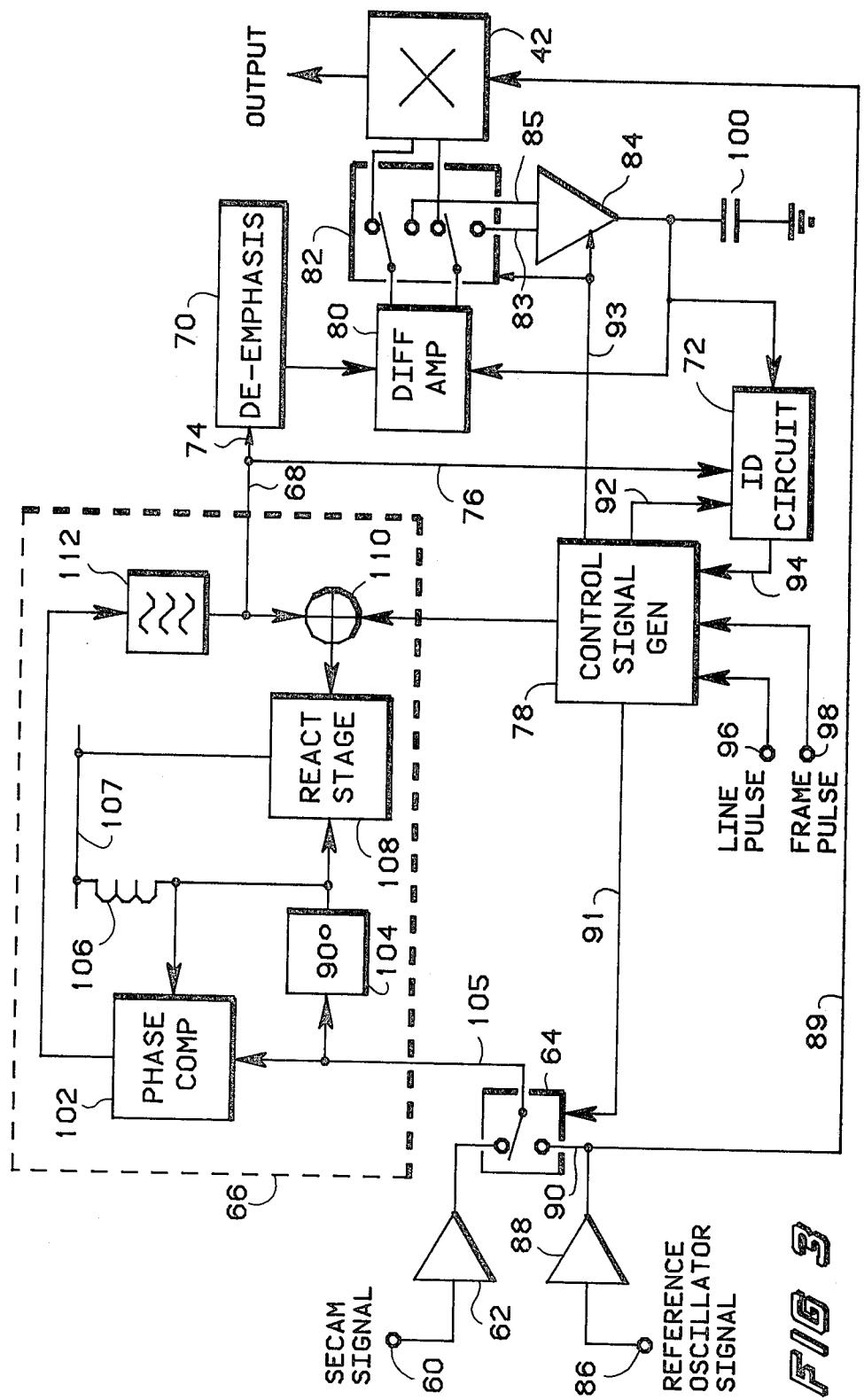

DEMODULATOR SYSTEM INCLUDING A TUNABLE DISCRIMINATOR SUITABLE FOR USE IN A SECAM TELEVISION RECEIVER

BACKGROUND OF THE INVENTION

This invention relates to color television demodulator systems and more particularly to a chroma demodulator section of a television receiver for receiving Secam broadcast signals wherein a tunable discriminator is provided for tuning the demodulator to the Secam reference frequencies.

In Secam color television receiver systems the chrominance signals R-Y and B-Y are transmitted sequentially line by line by frequency modulation of an RF subcarriers as is known. To allow correct identification of these signals in the receiver the R-Y subcarrier has a frequency of 4.40625 megaHertz and the B-Y subcarrier a frequency of 4.250 megaHertz. These two reference frequencies are commonly referred to as $f_oR$ and $f_oB$ respectively. To permit correct hues to be regenerated in the television receiver the frequency discriminator section of the chroma demodulator must provide a zero (or a precisely known) output at both the frequency $f_oR$ of the R-Y line and at the frequency $f_oB$ of the B-Y line.

Contemporary Secam television receivers usually meet this requirement by using two frequency discriminators, e.g., Foster-Seeley discriminators, each tuned respectively to the center frequencies $f_oR$ and $f_oB$. However, to maintain visibly neutral gray tones, the tuning accuracies must be typically ±5 KHz on each of the two discriminators. This accuracy must be maintained during the life of the receiver and over the full ambient temperature range in which the television receivers exist. Such performance is not attainable with components and present day manufacturing techniques.

To overcome the above problems, various attempts have been made to use the burst of the $f_oR$ and $f_oB$ frequencies, which are transmitted at the beginning of the R-Y and B-Y lines respectively, as a precise frequency reference. A number of technical difficulties however have made this impractical.

Another prior art system for demodulating the Secam chrominance signals uses a single frequency discriminator to which are fed the R-Y and B-Y lines in sequence, yielding demodulated outputs of the R-Y and B-Y information in sequence. These signals are then passed via direct and delayed paths to a commutator operating at half the line frequency such that at one output of the commutator there appears the R-Y signal and at the other output appears the B-Y signal. A problem exists in these system due to the fact that the delay lines, which are almost universally employed today, are glass delay lines and operate only at RF frequency. Therefore, the signal to be delayed must first be amplitude modulated onto a suitable subcarrier then demodulated after passage through the delay line. This subcarrier frequency must be precise and typically is provided by a reference oscillator incorporating a crystal.

It is an aspect of the present invention to provide an improved demodulator system suitable for use in Secam color television receivers.

Another aspect of the present invention is to provide a demodulator for a Secam color television receiver including a single tunable discriminator for setting the demodulating system to the sequential reference frequencies.

SUMMARY OF THE INVENTION

In accordance with the foregoing there is provided a demodulator system for use in a Secam television receiver including a single frequency locked loop discriminator of which the center frequency is electronically tuned in sequence with the Secam reference frequencies to provide an output of precisely zero (or of a chosen reference level) during the appropriate lines.

DESCRIPTION OF THE DRAWINGS

FIG. 3 is a partial schematic and block diagram of the discriminator-remodulator section of the chroma demodulator stage of the present invention.

DESCRIPTION OF THE SPECIFIC EMBODIMENT

Figure 1:
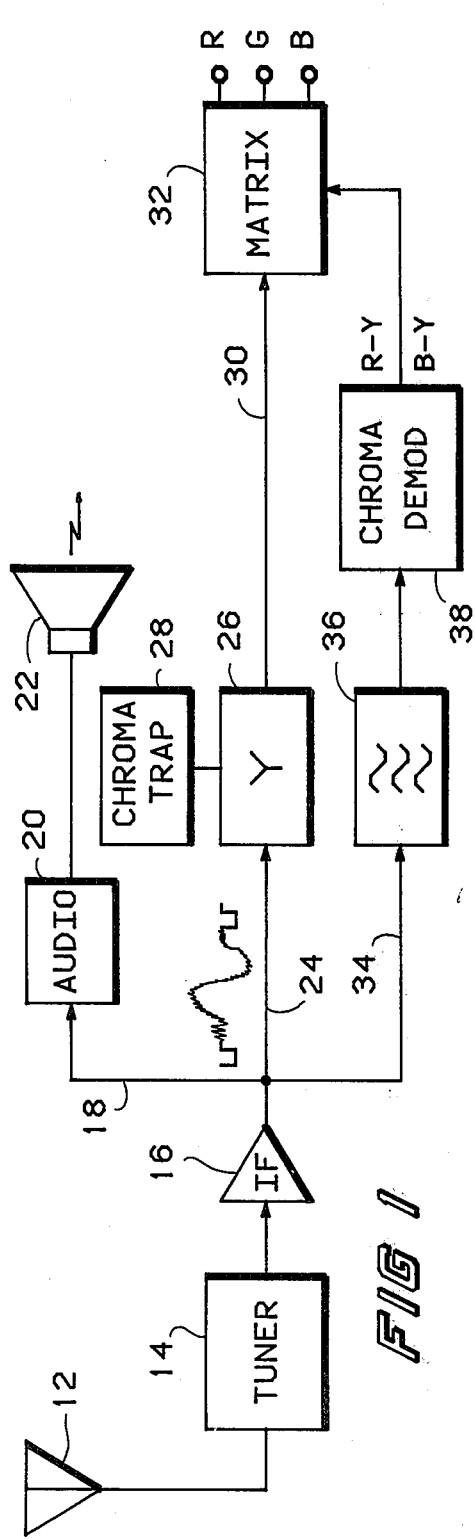
FIG. 1 is a simplified block diagram of a Secam television receiver system.

Turning to FIG. 1 there is shown a simplified schematic of a Secam television receiver which is well known to those skilled in the art. As illustrated, the television receiver 10 includes an antenna 12 coupled to T.V. tuner 14. The output of tuner 14 is coupled to an IF amplifier 16 an output thereof being provided via line 18 to audio system 20 which processes the signal provided thereto to provide audio signals to speaker 22. There also appears at the output of IF amplifier the composite video signal of the form shown which includes a sync pulse, the identification burst signal and the video information signal. This composite signal is applied via lead 24 to the luminance channel 26 which has a chroma trap 28 provided so that at the output of luminance channel 26 there appears the luminance signal Y which is provided over lead 30 to the matrix 32. The video composite signal including the modulated Secam sequential identification signals is provided via lead 34 to "Cloche" filter 36 and then to chroma demodulator 38. Chroma demodulator 38 processes the modulated Secam signals to provide the R-Y and B-Y chrominance signal information signals which are then supplied to matrix 32. The two chrominance signals are then summed with the luminance channel information to provide the red, green and blue hue control signals at the outputs of matrix channel 32 which are fed to the television cathode ray tube, as is known, to provide the color information control signals.

Figure 2:
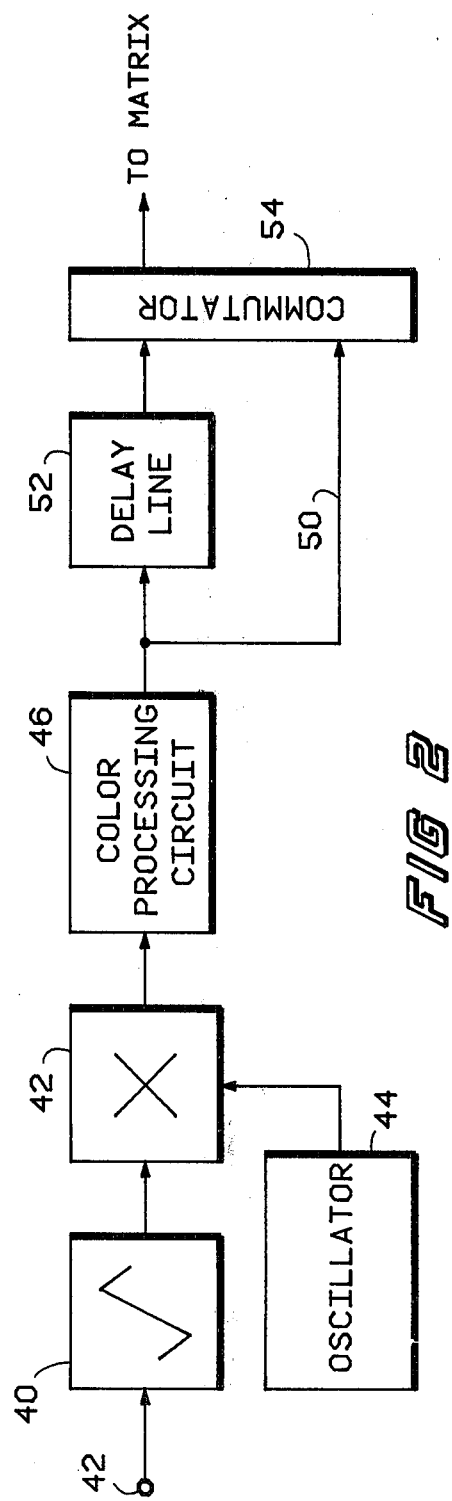
FIG. 2 is a more detailed block diagram schematic illustrating the chroma demodulator section of the Secam television receiver system of FIG. 1 including the discriminator and remodulator portion of the preferred embodiment of the present invention.

Turning to FIG. 2, chroma demodulator section 38 is illustrated in more detail and includes discriminator 40 having an input which is generally coupled to the output of "Cloche" filter 36 at terminal 42 wherein the modulated Secam input signals are operated on to provide a linear output voltage carrying the color information of each picture line to be displayed across the display tube. The output of the discriminator is fed via a low pass filter to remove the residual high frequency components and is then de-emphasized and supplied to a remodulator 42 wherein the linear output of discriminator 40 amplitude modulates a subcarrier frequency signal provided by oscillator 44. The frequency of oscillator 44, for convenience, may be at 4.4336 MHz; the PAL crystal frequency. It should be noted, that although the present invention refers to the reference signal provided from oscillator 44 as being equal to the Pal crystal frequency, any frequency within an acceptable range may be provided. The output of remodulator 42 is provided to color processing circuit 46 which may include the three control stages; automatic color control (ACC), contrast control and saturation control as is known to those skilled in the art. The output of color processing circuit 46 is processed directly, via lead 50 and indirectly through delay line 52 to commutator 54 as is also known to those skilled in the art. The R-Y and B-Y outputs appear separated at the output of commutator 54 and are applied to matrix 32 as aforementioned.

Turning now to FIG. 3 there is illustrated discriminator 40 and associated control circuitry in combination with remodulator 42 of the preferred embodiment of the present invention. The sequential frequency modulated Secam $f_oR$ and $f_oB$ signals are supplied at input terminal 60 to amplifier 62 with the output thereof being connected to switch 64. Switch 64 which, for example, may be a transistor switch, has an output coupled to the input of a frequency locked loop discriminator 66. Frequency locked loop discriminator 66 is of the type that is fully described in U.S. Pat. No. 4,127,825, assigned to Motorola, Inc., for example, and will not be explained in great detail hereinafter. The output of discriminator 66 is taken via lead 68 and is supplied to both de-emphasis network 70 and identification circuit 72 via leads 74 and 76 respectively. As will be described in more detail hereinafter, frequency locked loop discriminator 66 has a center frequency which is made tunable and is controlled by the control output signal from control signal generator 78 such that during the period of the information carrying parts of the picture line signals the center frequency is adjusted by a known amount to produce nominal tuning frequencies corresponding to the $f_oR$ and $f_oB$ frequencies. Ideally then, the output appearing at lead 68 is zero during the R-Y and B-Y line sequences, at the $f_oR$ and $f_oB$ frequencies. The output of de-emphasis network 70 is provided to one input of differential amplifier 80, the differential outputs of which are provided via switch 82 to either remodulator 42 or to the comparator inputs 83 and 85 of comparator 84.

A reference oscillator signal is provided at terminal 86 and applied to amplifier 88 the output of which is fed both to switch 64 via lead 90 and to remodulator 42 such that this signal is amplitude modulated by the signals supplied at the output of differential amplifier 80, as previously discussed. The output of remodulator 42 is then supplied to the aforementioned color processing circuit 46 to eventually provide the red, green, and blue hue control signals. Additional outputs from control signal generator 78 are provided respectively to switch 64, via lead 91, and, via lead 92, to identification circuit 72. The output of identification circuit 72 is supplied to control signal generator 78 via lead 94. Additionally, line pulse and frame pulse control signals are supplied at terminals 96 and 98 respectively to control signal generator 78. The output of comparator 84 appears across a clamping capacitor 100 and is supplied to the input of identification circuit 72 and to a second input of differential amplifier 80.

Frequency locked loop discriminator 66 is shown as comprising phase comparator 102 and a 90 degree phase shift circuit 104 each having their respective input connected to the output of switch 64 via lead 105. The output of 90 degree phase shift circuit 104 is coupled to an input of phase comparator 102 and to a LC tuned circuit comprising coil 106 which is returned to an operating potential at conductor 107. The capacitance of the LC tuned circuit is provided by reactance stage 108 of which the value is varied by the control signal appearing at the output of summing circuit 110. The output of phase comparator 102 is applied to the output of the frequency locked loop discriminator at lead 68 through low pass filter 112, the output of which is also connected to one input of summing circuit 110. The other input to summing circuit 110 is supplied from the output of control signal generator 78.

As will be explained, the present invention embodies the tuning of the center frequency of frequency locked loop discriminator 66 in a controlled manner. First, the discriminator is tuned to a nominal reference frequency during a convenient part of a flyback period, then to a second center frequency having a value midway between the subcarrier reference frequencies during the identification periods and then alternately to the center frequencies corresponding to the $f_oR$ and $f_oB$ sequential Secam subcarrier frequencies during the chroma information carry portions of each line.

In operation, during the fly back period of the television receiver system, i.e., during the clamp period which contains no picture or other relevant information, a clamp pulse is supplied from control signal generator 78 via leads 91 and 93 to control transistor switches 64 and 82 accordingly. Therefore, during the clamp period the reference oscillator signal is supplied via switch 64 to the input of discriminator 66. (In the preferred embodiment the oscillator signal appears at a frequency of 4.4336 MHz although any frequency in the region of the Secam subcarrier frequencies could be used.) During the clamp period the center frequency of discriminator 66 is tuned to the reference oscillator frequency. The output of discriminator 66 supplied at the output of low pass filter 112 is either zero or at some error level which is applied through de-emphasis network 70 and differential amplifier 80 to switch 82. Switch 82 is activated during the clamp period whereby the outputs of differential amplifier 80 are coupled to comparator 84. Comparator 84 is gated on during the clamp period by the clamp pulse appearing via lead 93 such that an output voltage is developed and stored on clamp capacitor 100. The frequency at which discriminator 66 output signal is zero (the center frequency) is equal to the resonant frequency of inductor 106 and reactance stage 108. As understood, discriminator 66 exhibits a linear characteristic such that the center frequency can be controlled in a linear fashion.

Hence, during the clamp period a voltage is stored on capacitor 100 which equalizes the output currents from differential amplifier 80 to correspond to a zero output from discriminator 66 when it is at its reference center frequency. As will be explained later, the stored voltage will be utilized to equalize the output currents of differential amplifier 80 during active line periods when the discriminator output matches the level obtained during the clamp period. This technique compensates for offset voltages in the differential amplifier.

During the periods of the television lines carrying the Secam identification information (enabling the correct sequence of the R-Y and B-Y lines to be determined), i.e., during the first 4 µs of each line and part of the frame blanking period, the discriminator is tuned to a constant frequency, e.g., 4.328 MHz which lies midway between the $f_oR$ and $f_oB$ subcarrier frequencies. Therefore, in response to each line sequentially received, the discriminator is shifted ±78 KHz from the center frequency of 4.328 MHz. These identification signals thus produce alternating positive and negative output pulses which are coupled to a balanced modulator forming a part of identification circuit 72 during the identification period, these alternating pulses are caused to be multiplied by a signal at half the line frequency to yield an output signal the sense of which indicates whether the line sequence is correctly identified. If not, identification circuit 72 provides an output to control signal generator such as to change the line sequence information to the correct sequence as understood. During the identification period differential amplifier 80 may be inhibited.

During the information carrying parts of the picture lines the control signal generator supplies the reactance stage 108, via summing circuit 110, with sequential control signals to offset the discriminator center frequency by $-27.6$ KHz and $-183.6$ KHz from the center frequency of 4.336 MHz maintained during the clamp period. Thus the nominal tuning frequencies of 4.406 MHz and 4.25 MHz are obtained in correct sequence (assuming correct identification) corresponding to $f_oR$ and $f_oB$; the R-Y and B-Y subcarriers. Thus, the discriminator output will match that obtained during the clamp period whenever the Secam signal is at the appropriate subcarrier frequency. Hence the voltage applied to the input of differential amplifier 80 through de-emphasis network 70 will match that applied during the clamp period which, with the voltage supplied from clamp capacitor 100, will equalize the output currents from differential amplifier 80 whenever the frequency modulated subcarrier signals are exactly at either $f_oR$ or $f_oB$, corresponding to zero modulation. These output currents are supplied via switch 82 to first inputs of remodulator 42. These input signals are multiplied by the reference oscillator signal frequency supplied to remodulator 42. The remodulator output will thus be a constant current containing no reference frequency components when the currents from differential amplifier 80 are equal, i.e., when the Secam signal applied at terminal 60 is at a frequency $f_oR$ during the R-Y line or at a frequency $f_oB$ during the B-Y line.

Since discriminator 66 is made linear, as previously defined, the voltage supplied via de-emphasis network 70 to differential amplifier 80 will vary from the zero output value proportionally to the frequency deviation of the Secam signal from the respective subcarrier frequency ($f_oR$ or $f_oB$). Thus, the output signal from remodulator 42, which is supplied to commutator 54, will be at the reference frequency of oscillator 88 amplitude modulated with the Secam information in a linear manner. The B-Y and R-Y chrominance information is in the form to be passed via delay line 52 to be subsequently reproduced at the output of commutator 54 as previously described.

Hence, there has been described a demodulator system for a Secam television receiver utilizing a single discriminator which is alternately tuned to the nominal $f_oR$ and $f_oB$ reference signals during the information carrying portion of the picture lines whereby the R-Y and B-Y chroma line signals are reproduced. These shifts produce, in conjunction with the clamping capacitor and associated feedback circuitry, a precisely zero or chosen reference at the output of remodulator 42 in response to the Secam signal being at either $f_oR$ or $f_oB$ without the necessity for precise and stable tuned circuits.

We claim:

1. A demodulator circuit for demodulation of an applied television chrominance signal, the chrominance signal comprising first and second sequential subcarrier frequencies frequency modulated by respective R-Y and B-Y chroma information signals, including a single frequency discriminator, the improvement comprising:
    the discriminator having an electrically tunable center frequency, said center frequency being repetitively tuned to a nominal center frequency during a part of a flyback period in response to a first control signal to produce a zero level output with a known reference frequency being applied thereto, the discriminator being offset by second and third control signals to first and second alternating center frequencies such that a zero output level is provided at the output of the discriminator at each of the two subcarrier frequencies, the zero output levels obtained in response to said subcarrier reference signals being caused to be the same as said zero output level obtained in response to said known reference frequency.

2. The demodulator circuit of claim 1 further comprising a differential amplifier having inputs and outputs, and a feedback circuit, said feedback circuit being coupled between the outputs and one input of said differential amplifier during said first part of the picture line when said discriminator is tuned to said nominal center frequency, the output of said discriminator being coupled to the second input of the differential amplifier such that said feedback circuit produces a potential to equalize the differential currents appearing at said outputs of said differential amplifier, said first input to said differential amplifier being maintained at said potential during the portion of the picture lines when the subcarrier frequencies are supplied to said discriminator.

3. The demodulator circuit of claim 2 wherein said differential amplifier forming a part of a modulator during the portion of each picture line when either the R-Y or B-Y chrominance signals are applied such that a reference carrier frequency supplied to said modulator is amplitude modulated by the output from said discriminator and that a zero carrier frequency output is produced from said modulator when said differential currents are equalized.

4. The demodulator circuit of claim 3 wherein said reference carrier frequency also serves as said known reference frequency which sets said discriminator to said nominal center frequency.

* * * * *